United States Patent
Chen et al.

(10) Patent No.: US 12,117,692 B1
(45) Date of Patent: Oct. 15, 2024

(54) DISPLAY MODULE AND DISPLAY DEVICE

(71) Applicant: Xiamen Tianma Micro-Electronics Co., Ltd., Xiamen (CN)

(72) Inventors: Ruxing Chen, Xiamen (CN); Yaozuo Ke, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/378,342

(22) Filed: Oct. 10, 2023

(30) Foreign Application Priority Data

Jun. 29, 2023 (CN) .......................... 202310791275.0

(51) Int. Cl.
*G02F 1/13357* (2006.01)
*G02F 1/1333* (2006.01)
*G02F 1/1335* (2006.01)

(52) U.S. Cl.
CPC .... *G02F 1/133605* (2013.01); *G02F 1/13338* (2013.01); *G02F 1/133512* (2013.01); *G02F 1/133514* (2013.01); *G02F 1/133528* (2013.01)

(58) Field of Classification Search
CPC ......... G02F 1/133603; G02F 1/133611; G02F 1/133615; G02F 1/133605; G02F 1/13338; G02F 1/133512; G02F 1/133514; G02F 1/133528; H04M 1/0264; H04M 1/0266; G02B 6/0068; H01L 33/24; H01L 33/58; H01L 33/60; H01L 33/54
See application file for complete search history.

(56) References Cited

U.S. PATENT DOCUMENTS

| | | | |
|---|---|---|---|
| 2012/0250350 A1* | 10/2012 | Kim ................... | G02F 1/133603 362/606 |
| 2020/0144466 A1* | 5/2020 | Endo ....................... | H01L 33/62 |
| 2021/0072599 A1* | 3/2021 | Mei ..................... | G02F 1/133626 |
| 2021/0407440 A1* | 12/2021 | Liu ..................... | G02F 1/133603 |
| 2022/0268421 A1* | 8/2022 | Chen ....................... | H04N 23/57 |
| 2023/0305332 A1* | 9/2023 | Ouyang ............. | G02F 1/133609 |

FOREIGN PATENT DOCUMENTS

| | | | | |
|---|---|---|---|---|
| CN | 110456444 A | | 11/2019 | |
| CN | 113296314 A | * | 8/2021 | ............. G02B 6/004 |
| CN | 113744641 A | * | 12/2021 | ......... G02F 1/13338 |
| CN | 114899202 A | | 8/2022 | |
| CN | 115763671 A | * | 3/2023 | ....... G02F 1/133603 |

* cited by examiner

*Primary Examiner* — Erin Kryukova
(74) *Attorney, Agent, or Firm* — Anova Law Group, PLLC

(57) ABSTRACT

A display module includes a backlight module and a display panel. The display panel is located at a light-emitting direction of the backlight module. The backlight module is provided with a through hole penetrating through the backlight module along a thickness direction of the backlight module, and has first region and a second region surrounding the first region. The first region surrounds the through hole. The backlight module includes a back plate and light-emitting elements arranged on a side of the back plate facing the display panel. The light-emitting elements include first light-emitting elements located in the first region and second light-emitting elements located in the second region. The first light-emitting elements are arranged around the through hole; and an arrangement density of the first light-emitting elements is larger than an arrangement density of the second light-emitting elements.

19 Claims, 12 Drawing Sheets

DISPLAY MODULE AND DISPLAY DEVICE

CROSS-REFERENCE TO RELATED APPLICATION

This application claims the priority of Chinese Patent Application No. 202310791275.0, filed on Jun. 29, 2023, the content of which is incorporated herein by reference in its entirety.

TECHNICAL FIELD

The present disclosure generally relates to the field of display technology and, more particularly, relates to a display module and a display device.

BACKGROUND

With the development of display technology, display panels have higher and higher screen-to-body ratios, and full-screen displays have received widespread attention because of their narrow-frame or even frame-less display effects. At present, space on the front of display devices such as mobile phones and tablet computers often needs to be reserved for photosensitive elements such as front cameras, infrared sensing devices, or fingerprint recognition devices. For example, a front camera may be disposed at a region under a display panel. The corresponding region may be used to perform photographing when the front camera is turned on and display pictures when the front camera is turned off, to achieve a full screen and the narrow-frame effect.

In existing technologies, to form a light path of a photosensitive element such as the front camera, a high light transmission area can be set up in a display area of a display panel to accommodate the above photosensitive element. Specifically, the high light transmission area is usually a through hole formed by hollowing out a backlight module. Since the display panel above the through hole needs to play a display function and a light source is not provided at the position of the through hole, the display brightness of a portion of the display area directly above the through hole is different from the display brightness of the conventional display area, resulting in uneven display.

SUMMARY

One aspect of the present disclosure provides a display module. The display module includes a backlight module and a display panel. The display panel is located at a light-emitting direction of the backlight module. The backlight module is provided with a through hole penetrating through the backlight module along a thickness direction of the backlight module, and has a first region and a second region surrounding the first region. The first region surrounds the through hole. The backlight module includes a back plate and light-emitting elements arranged on a side of the back plate facing the display panel. The light-emitting elements include first light-emitting elements located in the first region and second light-emitting elements located in the second region. The first light-emitting elements are arranged around the through hole; and an arrangement density of the first light-emitting elements is larger than an arrangement density of the second light-emitting elements.

Another aspect of the present disclosure provides a display device. The display device includes a display module. The display module includes a backlight module and a display panel. The display panel is located at a light-emitting direction of the backlight module. The backlight module is provided with a through hole penetrating through the backlight module along a thickness direction of the backlight module, and has a first region and a second region surrounding the first region. The first region surrounds the through hole. The backlight module includes a back plate and light-emitting elements arranged on a side of the back plate facing the display panel. The light-emitting elements include first light-emitting elements located in the first region and second light-emitting elements located in the second region. The first light-emitting elements are arranged around the through hole; and an arrangement density of the first light-emitting elements is larger than an arrangement density of the second light-emitting elements.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
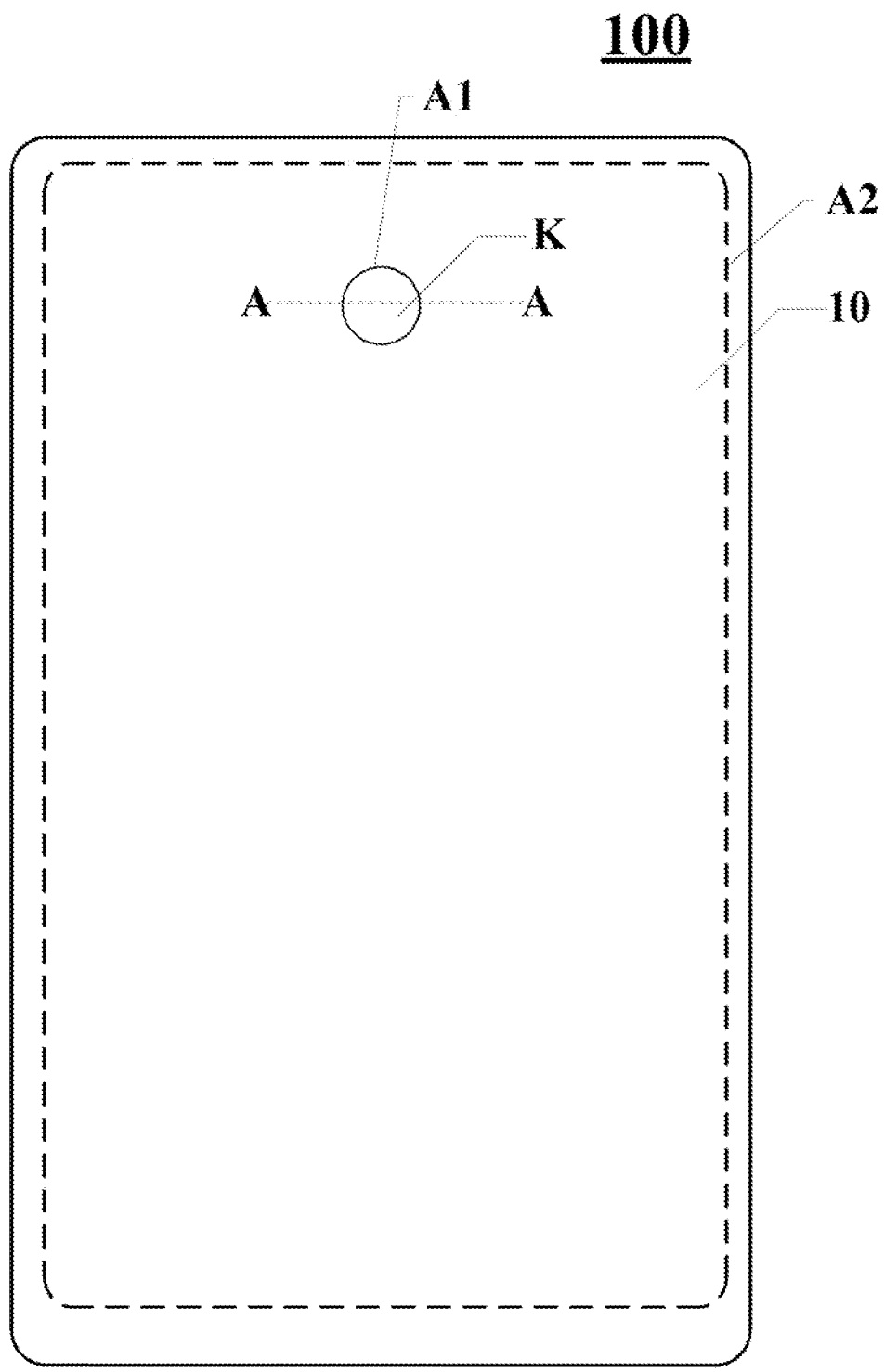
FIG. 1 illustrates an exemplary display module consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like components, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and are not intended to limit the scope of the disclosure. Furthermore, a three-dimensional (3D) size including length, width, and depth should be considered during practical fabrication.

Figure 2:
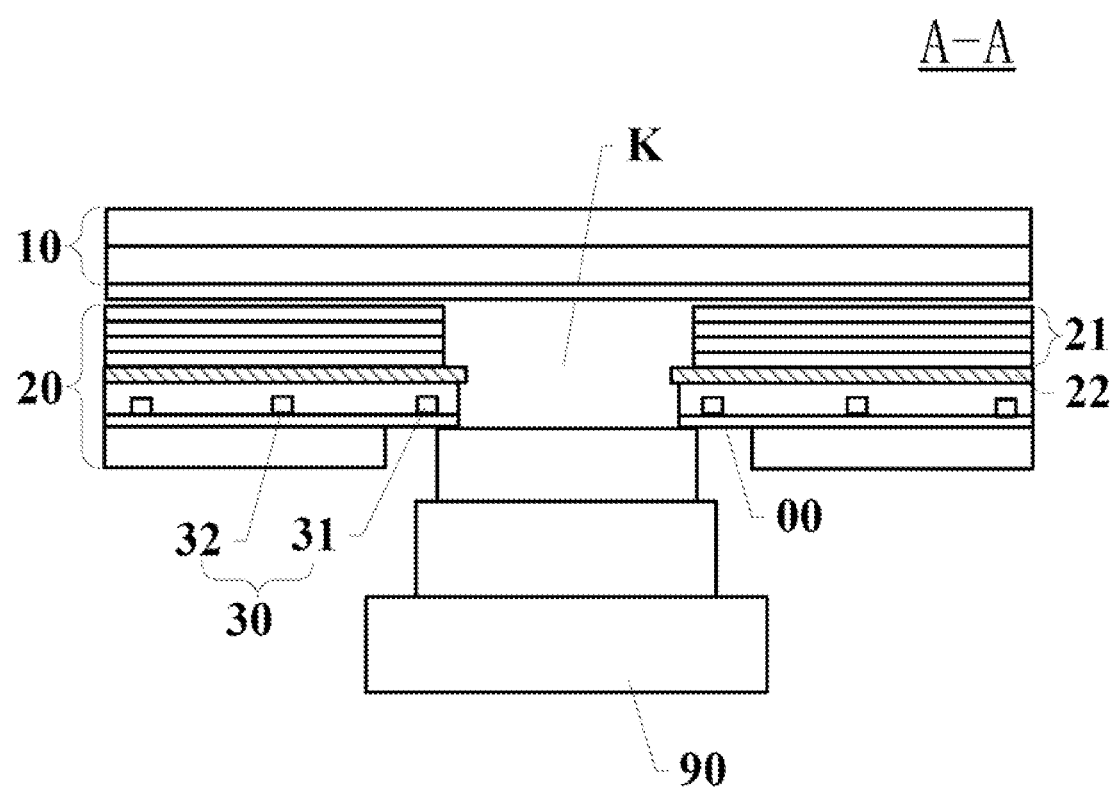
FIG. 2 illustrates a cross-sectional view along an AA direction in FIG. 1 consistent with various disclosed embodiments of the present disclosure.
Figure 3:
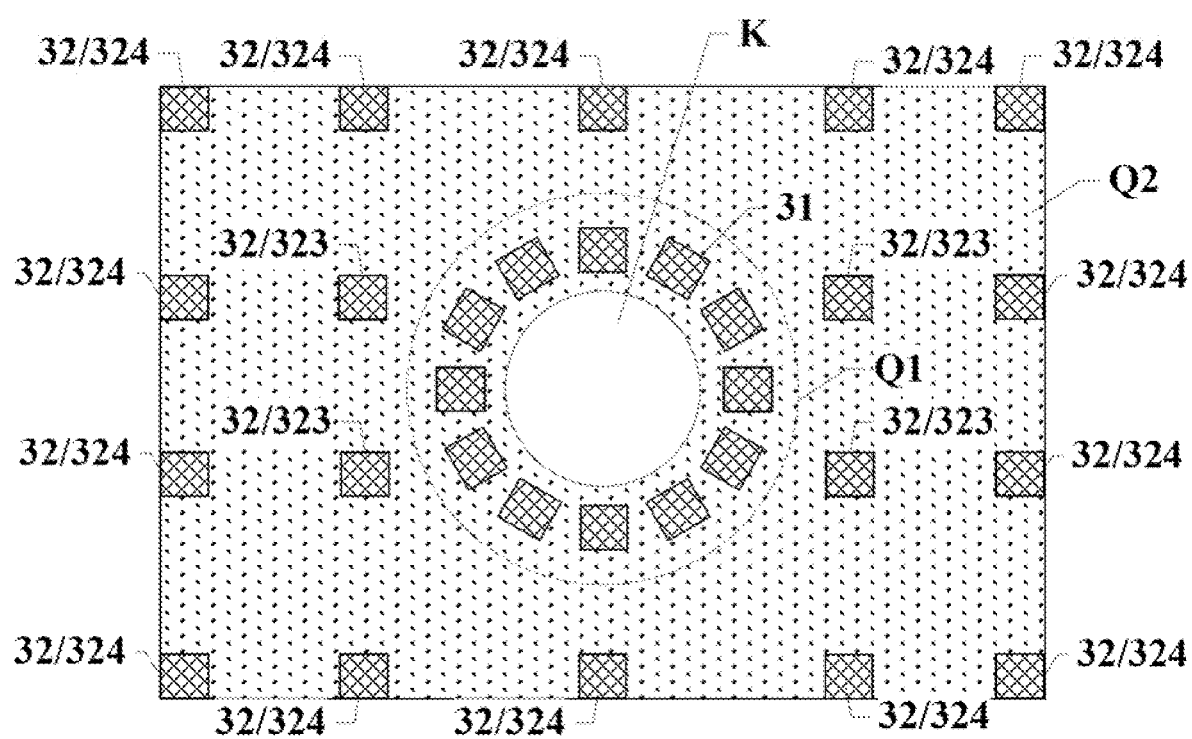
FIG. 3 illustrates an exemplary arrangement of first light-emitting elements and second light-emitting elements in a backlight module consistent with various disclosed embodiments of the present disclosure.

The present disclosure provides a display module. In one embodiment shown in FIG. 1 showing an exemplary display module consistent with various disclosed embodiments of the present disclosure, FIG. 2 illustrating a cross-sectional view along an AA direction of the display module in FIG. 1, and FIG. 3 illustrating an exemplary arrangement of first light-emitting elements and second light-emitting elements in a backlight, the display module 100 may include a backlight module 20 and a display panel 10. The display panel 10 may be located at a side of a light-emitting direction of the backlight module 20.

The backlight module 20 may be provided with a through hole K, and the through hole K may penetrate through the backlight module 20 along a thickness direction of the backlight module 20. The backlight module 20 may include a first region Q1 and a second region Q2 surrounding the first region Q1. The first region Q1 may surround the through hole K.

The backlight module 20 may include a back plate 00 and light-emitting elements 30 disposed on a side of the back plate 00 facing the display panel 10. The light-emitting elements 30 may include first light-emitting elements 31 in the first region Q1 and second light-emitting elements 32 in the second region Q2. The first light-emitting elements 31 may be arranged around the through hole K, and the arrangement density of the first light-emitting elements 31 may be larger than the arrangement density of the second light-emitting elements 32.

For description purposes only, the embodiment in FIG. 1 where the display panel 10 is a rounded rectangle is used as an example to illustrate the present disclosure, and does not limit the scope of the present disclosure. In various embodiments, the display panel 10 may be any other suitable shape, such as a rectangle, a circle, an oval, or another structure with arc edges. Also, the position of the through hole K in the display module shown in FIG. 1 is used as an example to illustrate the present disclosure, and does not limit the scope of the present disclosure. In various embodiments, the through hole K may be disposed at any suitable position in the display module. Also, the through hole K in the display module with the circular shape and size shown in FIG. 1 is used as an example to illustrate the present disclosure, and does not limit the scope of the present disclosure. In various embodiments, the through hole K may have any other suitable shape such as a rectangle or a runway shape, and any suitable size according to actual requirements. The positional relationship of the display panel 10, the backlight module 20, and the through hole K in FIG. 2 is used as an example to illustrate the present disclosure, and does not limit the scope of the present disclosure. The first light-emitting elements 31 and the second light-emitting elements 32 may include mini-LEDs or micro-LEDs.

In existing technologies, the through hole K is provided on the backlight module. In the photosensitive stage such as a photographing stage, the through hole transmits light to the camera. In the display stage, the area corresponding to the through hole displays images. However, since the light provided by the backlight module cannot be directly provided to the area corresponding to the through hole, during the display stage, the display brightness of the display area corresponding to the through hole is quite different from other display areas, which affects the display effect of the full screen.

In the display module provided by the present disclosure, the display panel 10 may be arranged on the side of the light-emitting direction of the backlight module 20. The backlight module 20 may be provided with the through hole K. The backlight module 20 may include the first region Q1 arranged around the through hole K and the second region arranged around the first region Q2. The first light-emitting elements 31 may be disposed in the first region Q1, and the second light-emitting elements 32 may be disposed in the second region Q2. The first light-emitting elements 31 may be arranged around the through hole K, and the arrangement density of the first light-emitting elements 31 may be larger than the arrangement density of the second light-emitting elements 32. The arrangement density of the light-emitting elements 30 refers to the number of light-emitting elements 30 arranged in the same unit area. For example, as shown in FIG. 3, a distance between two adjacent first light-emitting elements 31 in the first region Q1 may be smaller than a distance between two adjacent second light-emitting elements 32 in the second region Q2.

Since the arrangement density of the first light-emitting elements 31 is relatively high, the overall light output of the first light-emitting elements 31 in the first region Q1 may be increased. Since the first light-emitting elements 31 are arranged around the through hole K, the light emitted by the first light-emitting elements 31 may be emitted to the display area corresponding to the through hole K, to compensate the brightness of the display area corresponding to the through hole K. The large arrangement density of the first light-emitting elements 31 may be beneficial to improve the compensation of the brightness of the display area corresponding to the through hole K and reduce the display brightness difference between the conventional display area and the display area corresponding to the through hole K. Therefore, the overall display uniformity of the display panel 10 may be improved, to improve the overall display of the display panel 10.

Figure 4:
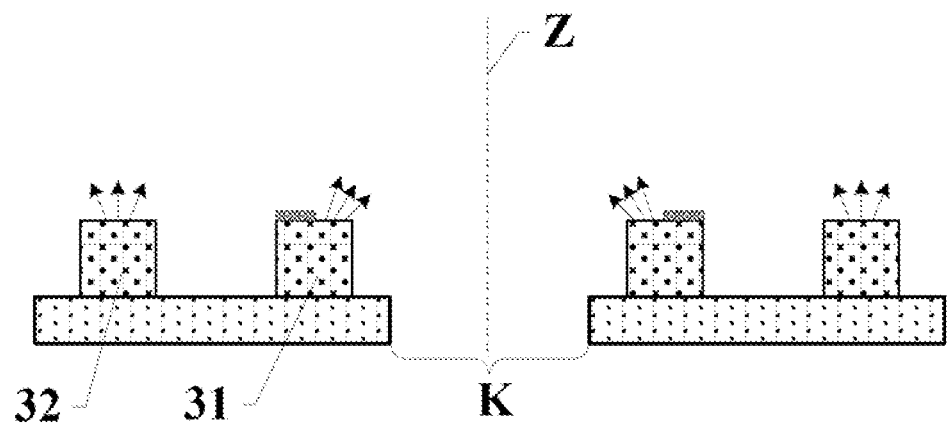
FIG. 4 illustrates an exemplary position relationship of first light-emitting elements and second light-emitting elements around a through hole, consistent with various disclosed embodiments of the present disclosure.

One embodiment shown in FIG. 4 shows an exemplary positional relationship of the first light-emitting elements 31 and the second light-emitting elements 32.

As shown in FIG. 4 with reference to FIG. 2, the first light-emitting elements 31 and the second light-emitting elements 32 may have different light-emitting patterns. Optionally, in one embodiment, the light-emitting pattern corresponding to the first light-emitting elements 31 may be a single-sided special-shaped light-emitting pattern and the light emitted by one of the first light-emitting elements 31 may be effectively deflected toward the direction where the central axis Z of the through hole K is located. That is, among the light emitted by the first light-emitting elements 31, more light may be emitted towards the central axis of the through hole K. The light-emitting pattern corresponding to the second light-emitting elements 32 may be a normal light pattern. That is, the amount of light emitted by the second light-emitting elements 32 may be the largest at a front viewing angle, and more light may be emitted towards the direction of the display panel 10 directly above the second light-emitting elements 32. In the present embodiment, the first light-emitting elements 31 with the single-sided special-shaped light pattern structure may be introduced into the first region Q1 of the backlight module 20. The light-emitting direction of the light emitted by the first light-emitting elements 31 of the single-sided special-shaped light pattern may be changed, and more light emitted by the first light-emitting elements 31 may be emitted toward the central axis of the through hole K, instead of toward the front viewing angle. Therefore, more light emitted by the first light-emitting elements 31 may be directed to the display area directly above the through hole K, realizing effective supplementary light to the display area directly above the through hole K. The display brightness difference between the display area above the through hole K and the conventional display area may be suppressed, to improve the overall display uniformity of the display module. Further, the second light-emitting elements 32 of the conventional light pattern may be disposed in the second region Q2. Since the second light-emitting elements 32 emits a large amount of light at the front viewing angle, the brightness of the second region Q2 at the front viewing angle may be improved, to ensure the display brightness of the second region Q2 in the display panel.

Figure 5:
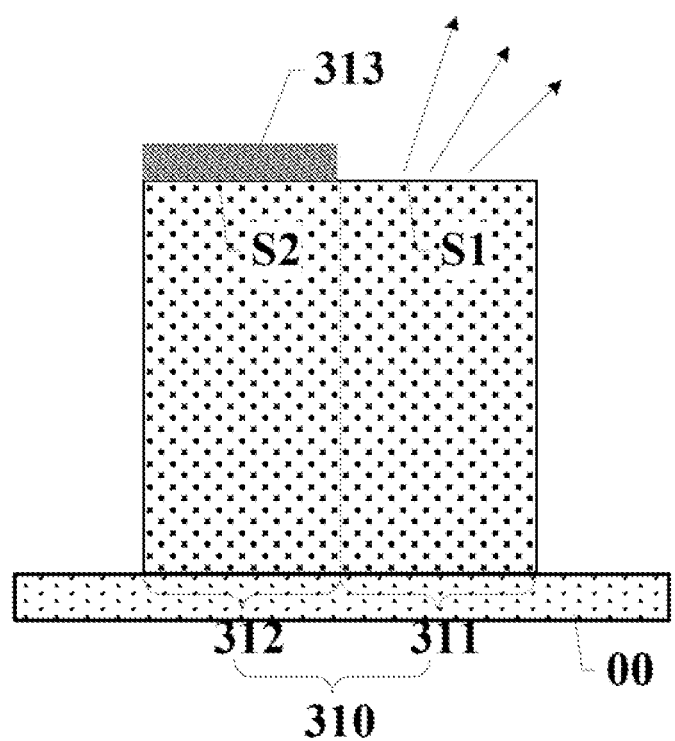
FIG. 5 illustrates an exemplary structure of a first light-emitting element consistent with various disclosed embodiments of the present disclosure.

FIG. 5 shows an exemplary first light-emitting element 31 provided by one embodiment of the present disclosure. As shown in FIG. 4 and FIG. 5, in one embodiment, the first light-emitting element 31 may include a light-emitting body 310 and a reflective layer 313. The light-emitting body 310 may include a first body 311 and a second body 312 arranged radially along the through hole K. The first body 311 may be disposed between the second body 312 and the through hole K. The reflective layer 313 may be at least disposed on the surface of the second body 312 away from the back plate 00.

The first light-emitting element 31 may be the single-sided special-shaped light pattern structure. To realize the single-sided special-shaped light pattern, in the present embodiment, the reflective layer 313 may be disposed on a portion of the surface of the light-emitting body 310 away from the back plate 00. When the light-emitting body 310 of the first light-emitting element 31 emits light and the light hits the reflective layer 313, the light may be reflected back into the light-emitting body 310 after being reflected by the reflective layer 313 and be emitted from the surface of the light-emitting body 310 without the reflective layer 313. When the first light-emitting element 31 is arranged around the through hole K, along the direction from the first light-emitting element 31 to the through hole K, the light-emitting body 310 of the first light-emitting element 31 may include the first body 311 and the second body 312. The first body 311 may be disposed between the second body 312 and the through hole K. A surface of the first body 311 away from the back plate 00 may be a first surface S1, and a surface of the second body 312 away from the back plate 00 may be a second surface S2. The first surface S1 may be located between the second surface S2 and the through hole K. The reflective layer 313 may be located on the second surface S2, and may be not provided on the first surface S1. Therefore, more light emitted by the light-emitting body 310 may pass through the first surface S1 to exit. Since the first surface S1 is closer to the through hole K, the light emitted through the first surface S1 may be emitted toward the central axis of the through hole K, and then directed to the display area directly above the through hole K, to effectively supplement light for the display area directly above the through hole K. The display brightness difference between the display area directly above the through hole K and the conventional display area may be suppressed, improving the overall display uniformity of the display panel 10.

The reflective layer 313 may be made of any material with reflective characteristics, such as aluminum or another material with high reflectivity. The reflective layer 313 may be fixed on the light-emitting body 310 of the first light-emitting element 31 by coating or pasting.

Figure 6:
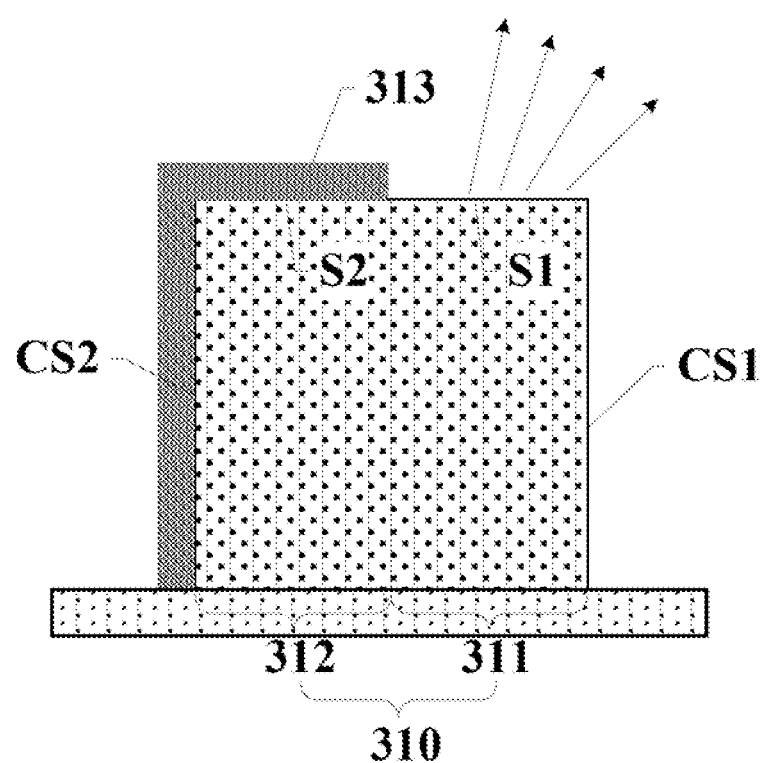
FIG. 6 illustrates another exemplary structure of a first light-emitting element consistent with various disclosed embodiments of the present disclosure.

In another embodiment shown in FIG. 6 which illustrates another structure of the first light-emitting element 31, the reflective layer 313 may be further located on at least part of the sidewall of the second body 312.

As shown in FIG. 4 and FIG. 6, the first light-emitting element 31 may be arranged around the through hole K. Along the direction from the first light-emitting element 31 to the through hole K, the first light-emitting element 31 may include a first side CS1 and a second side CS2. The first side CS1 may be located between the second side CS2 and the through hole K. That is, the first side CS1 may be a side of the first body 311, and the second side CS2 may be a side of the second body 312. In the present embodiment, the reflective layer 313 may be disposed on the second surface S2 of the light-emitting body 310 of the first light-emitting element 31 away from the back plate 00, and may be also disposed on the second side CS2 of the second body 312. When the reflective layer 313 is provided on the second surface S2 and the second side CS2 of the second body 312, when the light emitted by the light-emitting body 310 is irradiated to the second surface S2 and the second side CS2, the light may be further reflected into the light-emitting body 310, and most of this part of the light may be emitted through the first surface S1 without the reflective layer 313 and the first side CS1. Through the additional reflection of the reflective layer 313 on the second side CS2, the amount of light emitted from the first surface and the first side CS1 of the light-emitting body 310 may be further increased, to increase the amount of light directed toward the central axis of the through hole K. Therefore, the supplementary light to the display area directly above the through hole K may be increased, to further increase the brightness of the display area directly above the through hole K and reduce the display brightness difference between the display area directly above the through hole K and other display areas.

For description purposes only, the embodiments in FIG. 5 and FIG. 6 where the light-emitting body 310 of the first light-emitting element 31 is a rectangular structure are used as examples to illustrate the present disclosure, and do not limit the scope of the present disclosure. In various embodiments, the actual structure of the light-emitting body 310 of the first light-emitting element 31 may be any other suitable structure.

Figure 7:
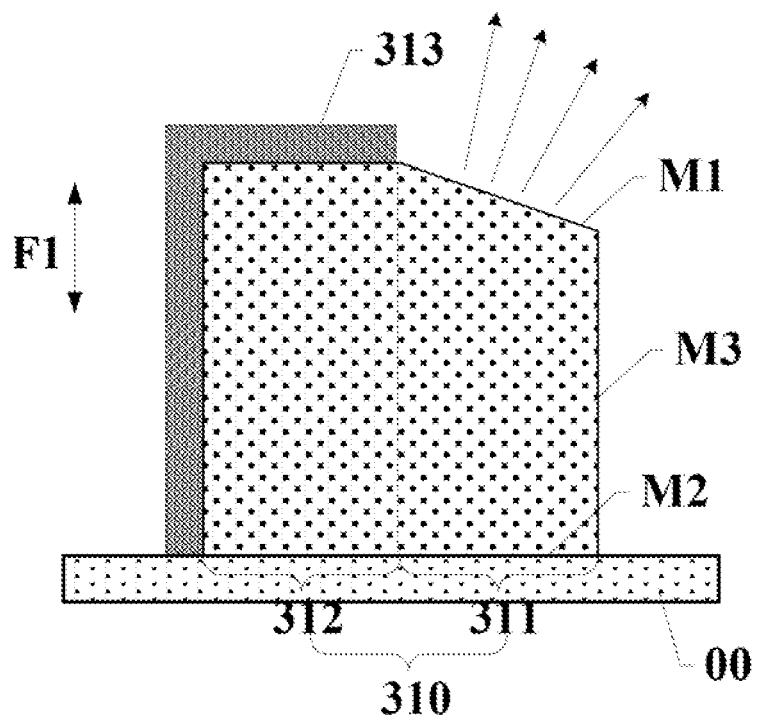
FIG. 7 illustrates another exemplary structure of a first light-emitting element consistent with various disclosed embodiments of the present disclosure.

For example, in one embodiment shown in FIG. 7 which illustrates another structure of the first light-emitting element 31, the light-emitting body 310 of the first light-emitting element 31 may be an irregular-shaped structure.

As shown in FIG. 7, the first body 311 may include a first surface M1, a second surface M2, and a third surface M3 located between the first surface M1 and the second surface M2 along a first direction F1. The third surface M3 may be respectively connected to the first surface M1 and the second surface M2. The second surface M2 may be located on a side of the first surface M1 facing the back plate 00. The first direction F1 may be perpendicular to the back plate 00. An angle between the first surface M1 and the third surface M3 may be an obtuse angle.

In the present embodiment, the light-emitting body 310 of the first light-emitting element 31 may have an irregular-shaped structure. The first body 311 of the first light-emitting element 31 without the reflective layer 313 may have an irregular-shaped structure. Among the first surface M1, the second surface M2 and the third surface M3 connected in sequence by the first body 311, the second surface M2 may be a surface parallel to the back plate 00 and closest to the back plate 00. The third surface M3 may connect the first surface M1 and the second surface M2. The first surface M1 may be the first surface of the first body 311 and may be an inclined surface. The angle between the first surface M1 and the third surface M3 may be an obtuse angle. That is, a distance between an end of the first surface M1 connected to the second body 312 and the back plate 00 may be larger than a distance between another end of the first surface M1 connected to the third surface M3 and the back plate 00. When the first light-emitting element 31 is disposed around the through hole K, the first body 311 may be disposed obliquely toward the display area directly above the through hole K. Therefore, when the light-emitting body 310 emits light, the obliquely arranged first surface M1 may adjust the light-emitting direction, such that more light may be emitted toward the display area directly above the through hole K. The light directed toward the display area directly above the through hole K may be increased, to achieve a better light compensation effect on the display area directly above the through hole K.

In one embodiment, the display module may further include a photosensitive element 90 disposed in the through hole K. The photosensitive element 90 and the first light-emitting elements 31 may be activated at different times.

The photosensitive element may be a functional device such as a camera. The display area directly above the through hole K may include two working stages, namely a photosensitive stage and a display stage. The photosensitive stage and the display stage may be performed at different times. That is to say, the photosensitive element 90 in the through hole K and the first light-emitting elements 31 around the through hole K may be activated at different times. In the photosensitive, the first light-emitting elements 31 may be turned off, and the photosensitive element in the through hole K may perform the photosensitive function. The light of the first light-emitting elements 31 may not be emitted to the through-hole K, to avoid causing damage to the photosensitive effect of the photosensitive element. In the display stage, the photosensitive element may be turned off, and the light emitted by the first light-emitting elements 31 may be directed to the display area directly above the through hole K, providing the display area directly above the through hole K with the light required for display. That is, the display area directly above the through hole K may be provided with a display light source. Therefore, the display brightness of the display area directly above the through hole K may be increased compared to a display module in the existing technology that does not provide a light source to the display area directly above the through hole K. The display brightness difference between the display area directly above the through hole K and the conventional display area may be suppressed, improving the display uniformity of the display panel 10.

Figure 8:
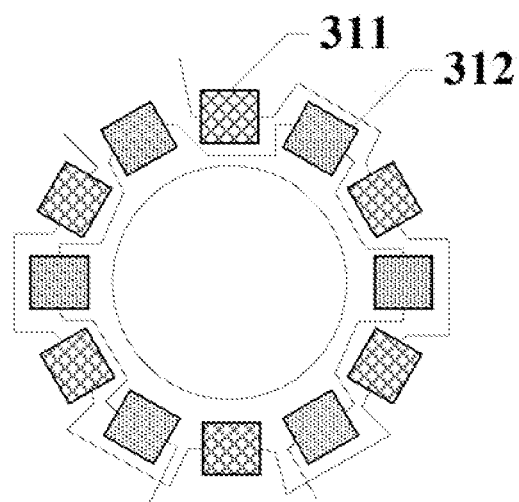
FIG. 8 illustrates an exemplary connection of first light-emitting elements around the through hole consistent with various disclosed embodiments of the present disclosure.

FIG. 8 is a schematic diagram of the connection of the first light-emitting elements 31 arranged around the through hole K. To clearly illustrate the connection relationship of the first light-emitting elements 31, different filling patterns are used in FIG. 8 to distinguish first sub-light-emitting elements 311 and second sub-light-emitting elements 312 in the first light-emitting elements 31, which are not used to limit the structure of the first sub-light-emitting elements 311 and the second sub-light-emitting element s312. The first sub-light-emitting elements 311 and the second sub-light-emitting elements 312 may be light-emitting elements 30 with exactly the same structure.

As shown in FIG. 8, in one embodiment, the first light-emitting elements 31 may include a plurality of first sub-light-emitting elements 311 and a plurality of second sub-light-emitting elements 312 arranged alternately around the through hole K. The plurality of first sub-light-emitting elements 311 may be connected in series, and the plurality of second sub-light-emitting elements 312 may be connected in series. The plurality of first sub-light-emitting elements 311 and the plurality of second sub-light-emitting elements 312 may be respectively connected to different signal terminals. In one embodiment, the signal terminals here may be terminals to which anodes of the light-emitting elements are connected. In one embodiment, cathodes of the plurality of first sub-light-emitting elements 311 connected in series and the plurality of second sub-light-emitting elements 312 connected in series may be connected to the same ground terminal.

In the present embodiment shown in FIG. 8, along the surrounding direction of the through hole K, the plurality of first sub-light-emitting elements 311 and the plurality of second sub-light-emitting elements 312 may be arranged alternately. One second light-emitting element 312 of the plurality of second sub-light-emitting elements 312 may be arranged between two first light-emitting elements 311 of the plurality of first sub-light-emitting elements 311, and one first sub-light-emitting element 311 of the plurality of first sub-light-emitting elements 311 may be disposed between two second sub-light-emitting elements 312 of the plurality of second sub-light-emitting elements 312. The plurality of first sub-light-emitting elements 311 may be connected in series, and the plurality of second sub-light-emitting elements 312 may be connected in series. The plurality of first sub-light-emitting elements 311 and the plurality of second sub-light-emitting elements 312 may be respectively connected to different signal terminals. The light-emitting status of the plurality of first sub-light-emitting elements 311 and the plurality of second sub-light-emitting elements 312 may be controlled through the signal terminals. In one implementation manner, only the plurality of first sub-light-emitting elements 311 connected in series may emit light. In another implementation, only the plurality of second sub-light-emitting elements 312 connected in series may emit light. In another implementation, the plurality of first sub-light-emitting elements 311 and the plurality of second sub-light-emitting elements 312 may emit light at the same time. The plurality of first sub-light-emitting elements 311 and the plurality of second sub-light-emitting elements 312 may be connected in series and individually controlled, to improve the flexibility of the light brightness provided by the first light-emitting elements 31 to the display area directly above the through hole K. Further, when only the plurality of first sub-light-emitting elements 311 emits light or only the plurality of second sub-light-emitting elements 312 emits light, the alternate arrangement of the plurality of first sub-light-emitting elements 311 and the plurality of second sub-light-emitting elements 312 may be beneficial to improve the uniformity of the light provided to the display area directly above the through hole K. Therefore, the display brightness uniformity of the display area directly above the through hole K may be improved.

Figure 9:
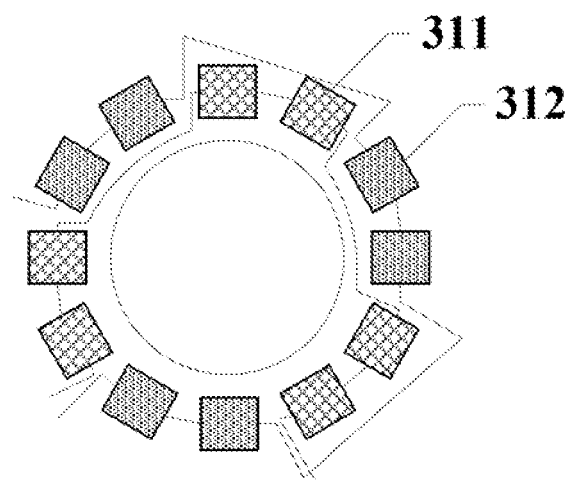
FIG. 9 illustrates another exemplary connection of first light-emitting elements around the through hole consistent with various disclosed embodiments of the present disclosure.

In the embodiment shown in FIG. 8, the plurality of first sub-light-emitting elements 311 and the plurality of second sub-light-emitting elements 312 may be alternately arranged in a one-by-one manner, to improve the uniformity of the light provided to the display area. In some other embodiments shown in FIG. 9, the plurality of first sub-light-emitting elements 311 and the plurality of second sub-light-emitting elements 312 may be arranged alternately in pairs. That is, two second light-emitting elements 312 of the plurality of second sub-light-emitting elements 312 may be arranged between two first light-emitting elements 311 of the plurality of first sub-light-emitting elements 311, and two first sub-light-emitting elements 311 of the plurality of first sub-light-emitting elements 311 may be disposed between two second sub-light-emitting elements 312 of the plurality of second sub-light-emitting elements 312, to provide uniform light to the display area.

As shown in FIG. 2 and FIG. 3, in one embodiment, the second light-emitting elements 32 may include third sub-light-emitting elements 323 and fourth sub-light-emitting elements 324. The third sub-light-emitting elements 323 may surround the first light-emitting elements 31, and the fourth sub-light-emitting elements 324 may surround the third sub-light-emitting elements 323.

In one embodiment, when the photosensitive element 90 is turned off, one of the plurality of first sub-light-emitting elements 311 and the plurality of second sub-light-emitting elements 312 may be turned on and the driving current of the third sub-light-emitting elements 323 may be larger than the driving current of the fourth sub-light-emitting elements 324.

In another embodiment, when the photosensitive element 90 is turned off, both the plurality of first sub-light-emitting elements 311 and the plurality of second sub-light-emitting elements 312 may be turned on and the driving current of the third sub-light-emitting elements 323 may be smaller than the driving current of the fourth sub-light-emitting elements 324.

FIG. 3 shows a schematic arrangement of the first light-emitting elements 31 around the through hole K and a portion of the second light-emitting elements 32. The second light-emitting elements 32 may include the third sub-light-emitting elements 323 and fourth sub-light-emitting elements 324. The third sub-light-emitting elements 323 may be close to the first light-emitting elements 31 and surround the first light-emitting elements 31, and the fourth sub-light-emitting elements 324 may surround the third sub-light-emitting elements 323. That is, the third sub-light-emitting elements 323 may be closer to the through hole K and the fourth sub-light-emitting elements 324 may be farther away from the through-hole K. At least part of the light emitted by the third sub-light-emitting elements 323 may also be able to be transmitted to the display area directly above the through hole K. Therefore, the luminance of the third sub-light-emitting elements 323 may also affect the luminance of the display area directly above the through hole K. In the display stage, the photosensitive element 90 may be turned off. When the display brightness of the display area directly above the through hole K is different from the display brightness of the normal display area, but the difference is not large. It is unnecessary to turn on the plurality of first sub-light-emitting elements 311 and the plurality of second sub-light-emitting elements 312 at the same time to provide light to the display area directly above the through hole K. At this time, one of the plurality of first sub-light-emitting elements 311 and the plurality of second sub-light-emitting elements 312 may be turned on. When the light provided by the plurality of first sub-light-emitting elements 311 or the plurality of second sub-light-emitting elements 312 to the display area directly above the through hole K is not enough to compensate for the brightness difference of the display area, the driving current of the third sub-light-emitting elements 323 may be controlled to be larger than the driving current of the fourth sub-light-emitting elements 324, to increase the light-emitting brightness of the third sub-light-emitting elements 323, thereby increasing the amount of the light emitted by the third sub-light-emitting elements 323 and directed to the display area directly above the through hole K. The light emitted by the third sub-light-emitting elements 323 and directed to the display area directly above the through hole K may be used to compensate the difference in display brightness between the display area corresponding to the through hole K and the conventional display area, thereby realizing the precise adjustment of the display brightness of the corresponding display area corresponding to the through hole K. The display brightness difference between the display area corresponding to the through hole K and the conventional display area may be further balanced, improving the overall display uniformity of the display panel 10.

When the display brightness difference between the display area directly above the through hole K and the display brightness of the normal display area is large, in the display stage, the plurality of first sub-light-emitting elements 311 and the plurality of second sub-light-emitting elements 312 may be turned on at the same time. To prevent the display area directly above the through hole K from being too bright because of too much light provided by the third light-emitting elements 30 to the display area directly above the through hole K, the driving current of the third sub-light-emitting elements 323 may be reduced such that the driving current of the third sub-light-emitting elements 323 is smaller than the driving current of the fourth sub-light-emitting elements 324, to reduce the light-emitting brightness of the third sub-light-emitting elements 323 and reduce the amount of the light emitted by the third sub-light-emitting elements 323 and directed to the display area directly above the through hole K. The display brightness difference between the display area corresponding to the through hole K and the conventional display area may be further balanced, improving the overall display uniformity of the display panel 10.

Figure 10:
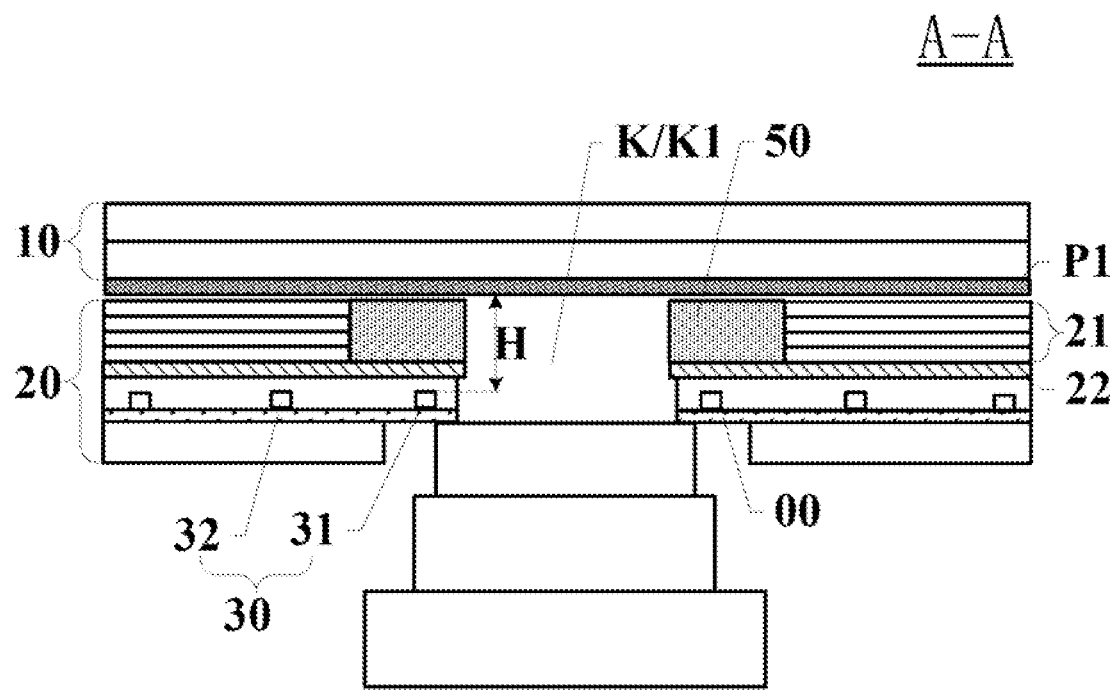
FIG. 10 illustrates another cross-sectional view along the AA direction of the display module in FIG. 1 consistent with various disclosed embodiments of the present disclosure.
Figure 11:
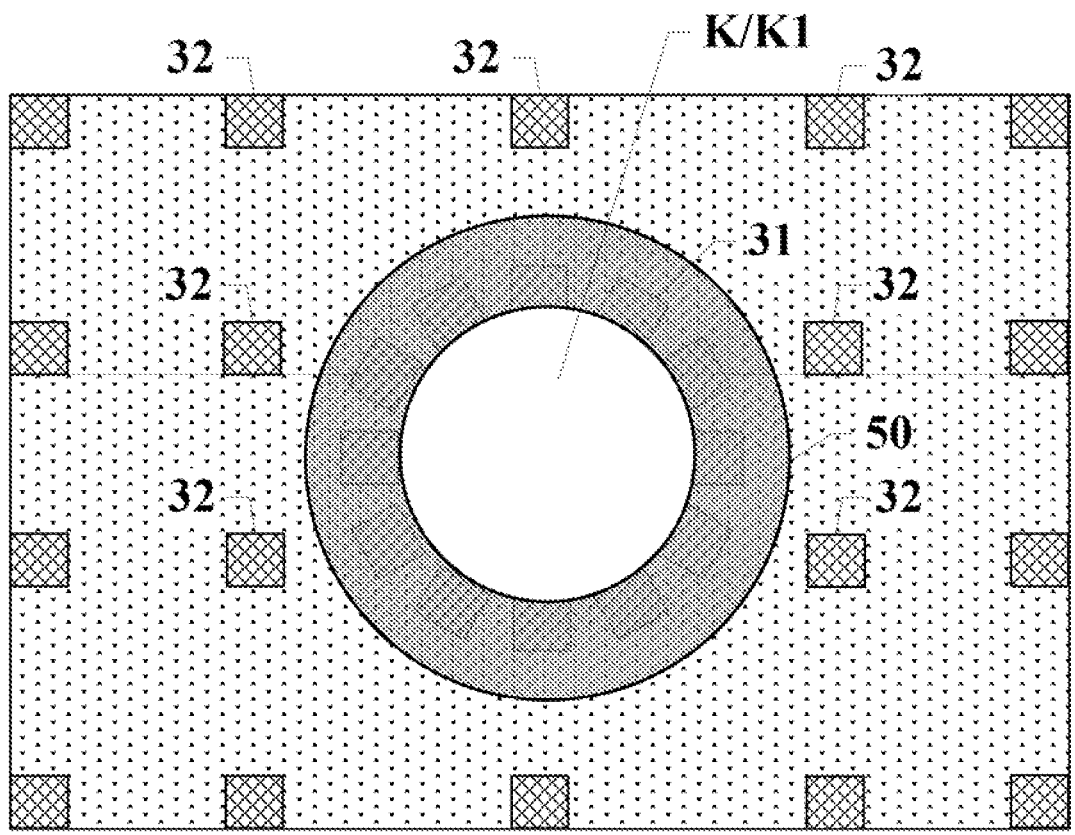
FIG. 11 illustrates a top view of a first optical film in FIG. 10 consistent with various disclosed embodiments of the present disclosure.
Figure 12:
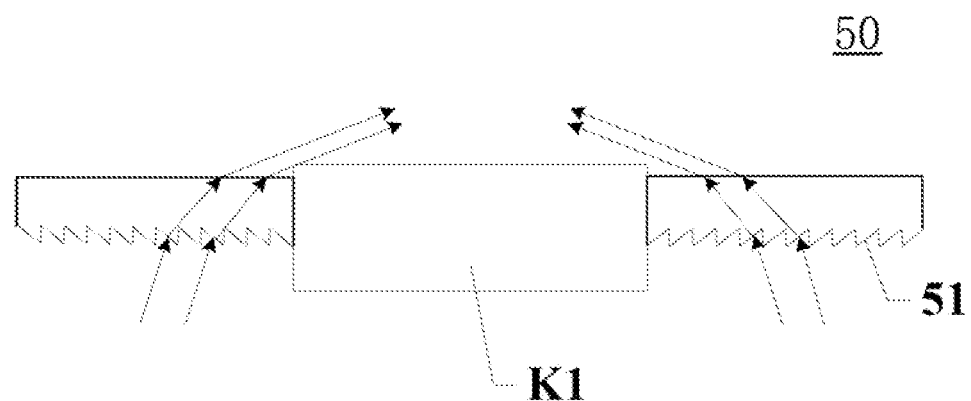
FIG. 12 illustrates an enlarged view of a first optical film in FIG. 10 consistent with various disclosed embodiments of the present disclosure.

In one embodiment shown in FIG. 10 illustrating another cross-sectional view of the display module along the AA direction in FIG. 1, FIG. 11 illustrating a top view of a first optical film in FIG. 10, and FIG. 12 shows an enlarged view of the first optical film, the display module may further include a first optical film 50. The first optical film 50 may be located in the through hole K, and between the display panel 10 and the first light-emitting elements 31. The first optical film 50 may include a first hollow part K1 that penetrates through the first optical film 50 along the thickness direction of the first optical film 50. An orthographic projection of the first light-emitting elements 31 to the plane of the back plate 00 may surround an orthographic projection of the first hollow part K1 to the plane of the back plate 00.

A first microstructure 51 may be disposed on a side of the first optical film 50 facing the first light-emitting elements 31. At least part of the light emitted by the first light-emitting elements 31 may enter the first hollow part K1 through the first microstructure 51 and transmitted to the display panel 10.

In the present disclosure, the first optical film 50 may be disposed in the through hole K. The first optical film 50 may be located on the side of the first light-emitting elements 31 facing the display panel 10. The first optical film 50 may include the first hollow part K1, and the central axis of the first hollow part K1 may be the same as the central axis of the through hole K. That is, the first optical film 50 may be an annular structure disposed in the through hole K and directly above the first light-emitting elements 31. Along the thickness direction of the display module, the annular structure of the first optical film 50 may overlap the first light-emitting elements 31. The first microstructure 51 may be disposed on the side of the annular structure of the first optical film 50 facing the first light-emitting elements 31. For example, as shown in FIG. 12, in one embodiment, the first microstructure 51 may be a sawtooth microstructure. After at least part of the light emitted by the first light-emitting elements 31 irradiates on the first microstructure 51, the light path may change, such that more light is emitted toward the display area directly above the through hole K. By disposing the first microstructure 51, the light emitted by the first light-emitting elements 31 may further converge to the display area directly above the through hole K, thereby increasing the amount of light directed to the display area directly above the through hole K. The effective utilization rate of the light emitted by the first light-emitting elements 31 may be improved.

Figure 13:
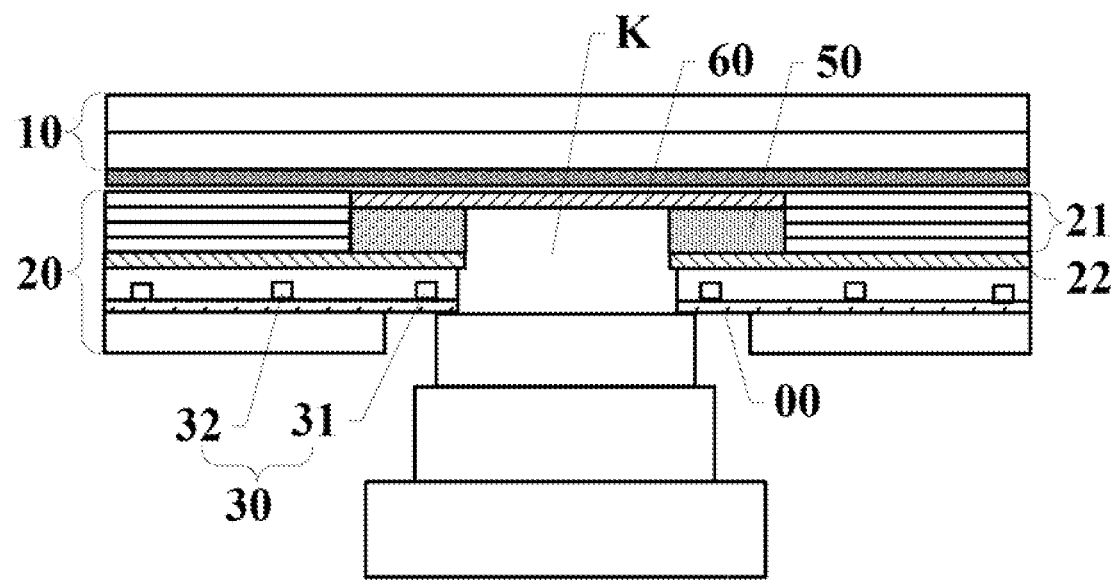
FIG. 13 illustrates another cross-sectional view along the AA direction of the display module in FIG. 1 consistent with various disclosed embodiments of the present disclosure.
Figure 14:
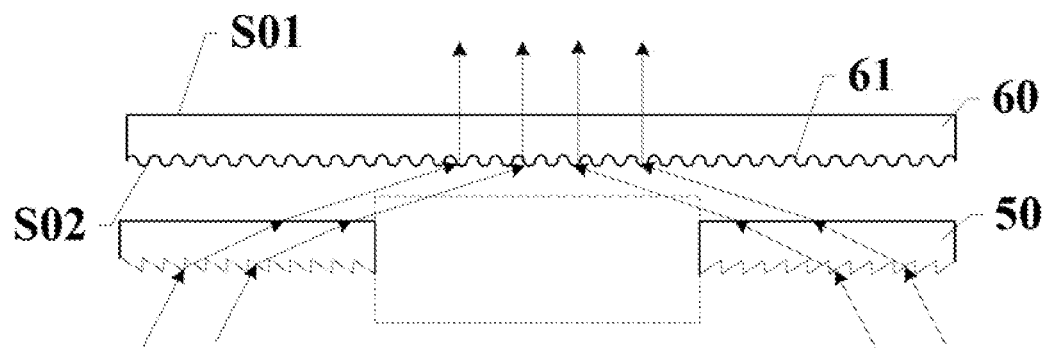
FIG. 14 illustrates a position relationship of a first optical film and a second optical film consistent with various disclosed embodiments of the present disclosure.

In one embodiment shown in FIG. 13 illustrating another cross-sectional view of the display module along the AA direction in FIG. 1 and FIG. 14 shows a positional relationship of a first optical film and a second optical film, the display module may further include a second optical film 60.

The second optical film 60 may be located in the through hole K, and disposed on a side of the first optical film 50 away from the first light-emitting elements 31. The second optical film 60 may be a planar structure, and include a first surface S01 and a second surface S02 opposite to each other. The second surface S02 may be located between the first surface S01 and the first optical film 50.

The first surface S01 may be parallel to the back plate 00, and the second surface S02 may be provided with a second microstructure 61. The light emitted from the first optical film 50 may pass through the second microstructure 61 and then exit along a direction perpendicular to the first surface S01. Optionally, in one embodiment, the second microstructure 61 on the second surface S02 may be a wavy microstructure.

In the present embodiment, the second optical film 60 may be further introduced into the through hole K, and the second optical film 60 may be located on the side of the first optical film 50 facing the display panel 10. The light emitted by the first light-emitting elements 31 may be emitted toward the display area directly above the through hole K after changing the light path by the first optical film 50. This part of the light may pass through the second optical film 60 before being emitted to the display panel 10. The surface of the second optical film 60 facing the first optical film 50 may be provided with the second microstructure 61. After the light passes through the second microstructure 61, the light path may be further changed, and finally the light may be emitted toward the display panel in the direction perpendicular to the display panel 10. When the light is emitted toward the display panel 10 obliquely, part of the light may be directed to a position in the display panel 10 that does not correspond to the through hole K, and this part of the light may not be effectively utilized (may not contribute to the brightness of the display area corresponding to the through hole). When the second optical film 60 is introduced on the side of the first optical film 50 facing the display panel 10, the light emitted through the second optical film 60 may be perpendicular to the direction of the display panel 10, thus ensuring that the light emitted by the second optical film 60 is directed to the display area corresponding to the through hole K. The utilization rate of the light emitted by the first light-emitting elements 31 may be further increased, to further improve the display brightness of the display area directly above the through hole K. The display brightness difference between the display area directly above the through hole K and the conventional display area may be reduced, to improve the display brightness uniformity of the display module.

In one embodiment shown in FIG. 13, the backlight module 20 may further include an optical module 21 disposed on a side of the light-emitting elements 30 away from the back plate 00. Along the direction parallel to the back plate 00, the optical module 21 may surround the first optical film 50. Along the direction perpendicular to the back plate 00, the optical module 21 may cover the second light-emitting elements 32 and may not overlap with the first light-emitting elements 31.

In the present embodiment, the optical module 21 may be an optical module disposed above the second light-emitting elements 32 for processing the light emitted by the second light-emitting elements 32. The optical module 21 may include film layers such as diffusion plate and brightness enhancement plate. Optionally, in one embodiment, the first light-emitting elements 31 and the second light-emitting elements 32 may be arranged on the same back plate 00, and a portion of the back plate corresponding to the first light-emitting elements 31 may be regarded as be formed by extending the portion of the back plate corresponding to the second light-emitting element 31 into the through hole K. Along the thickness direction of the display module, the first light-emitting elements 31 may not overlap with the optical module 21. When the first optical film 50 is introduced, the first optical film 50 may be disposed directly above the first light-emitting elements 31 and the back plate corresponding to the first light-emitting elements 31. The optical module 21 may completely surround the first optical film 50 at this time. The light emitted by the first light-emitting elements 31 may be processed by the first optical film 50 and directed to the display area corresponding to the through hole K. The light emitted by the second light-emitting element 32 may be directed to the normal display area after being processed by the optical module 21. Therefore, the problem of uneven display brightness between the display area corresponding to the through hole K and the conventional display area may be solved.

In another embodiment shown in FIG. 2, the backlight module 20 may further include an optical module 21 disposed on a side of the light-emitting elements 30 away from the back plate 00. Along the direction perpendicular to the back plate 00, the optical module 21 may cover the second light-emitting elements 32 and the first light-emitting elements 31.

In the present embodiment, the display module may not include the first optical film 50. The optical module 21 may include film layers such as diffusion plate and brightness enhancement plate. Along the direction perpendicular to the back plate 00, that is, along the thickness direction of the display module, the optical module 21 may cover the second light-emitting elements 32 and the first light-emitting elements 31. By introducing the first light-emitting elements 31 with larger arrangement density of the first light-emitting elements 31 and further setting the first light-emitting elements 31 and the second light-emitting elements 32 to have different light patterns, the emitting direction of light from the first light-emitting elements 31 may be changed, such that more of the light emitted by the first light-emitting elements 31 may be directed towards the direction of the display area corresponding to the through hole K. Therefore, the compensation of the light of the display area directly above the through hole K may be realized without changing other structures of the display module. The overall display brightness uniformity of the display panel 10 may be improved, and the overall structural design of the display panel 10 may be simplified, thereby reducing the manufacturing process of the display module and improving production efficiency.

Figure 15:
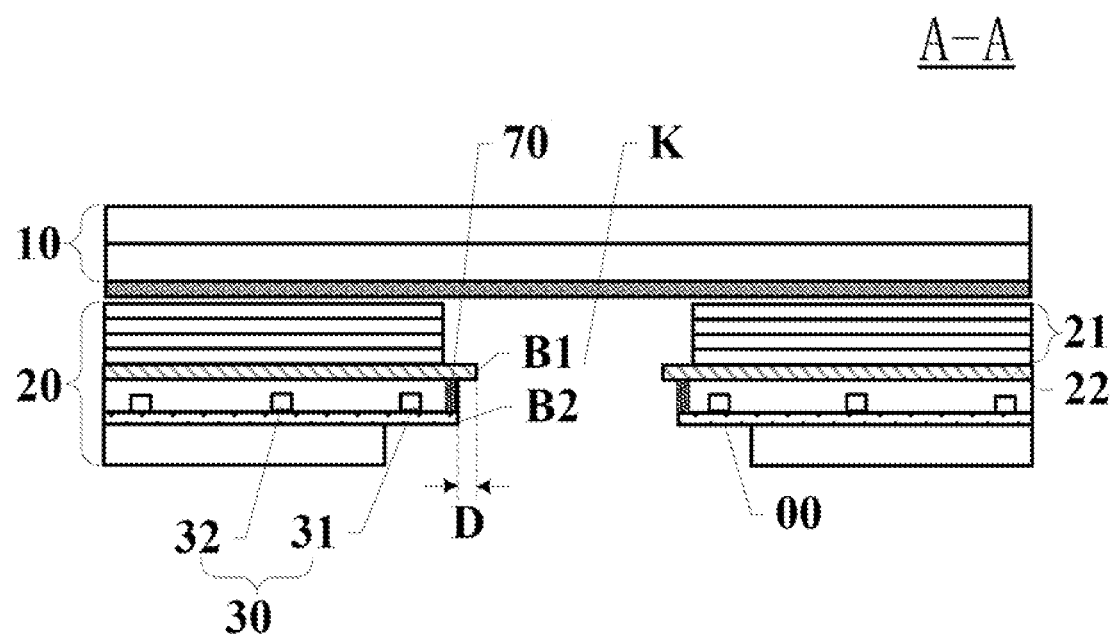
FIG. 15 illustrates another cross-sectional view along the AA direction of the display module in FIG. 1 consistent with various disclosed embodiments of the present disclosure.
Figure 16:
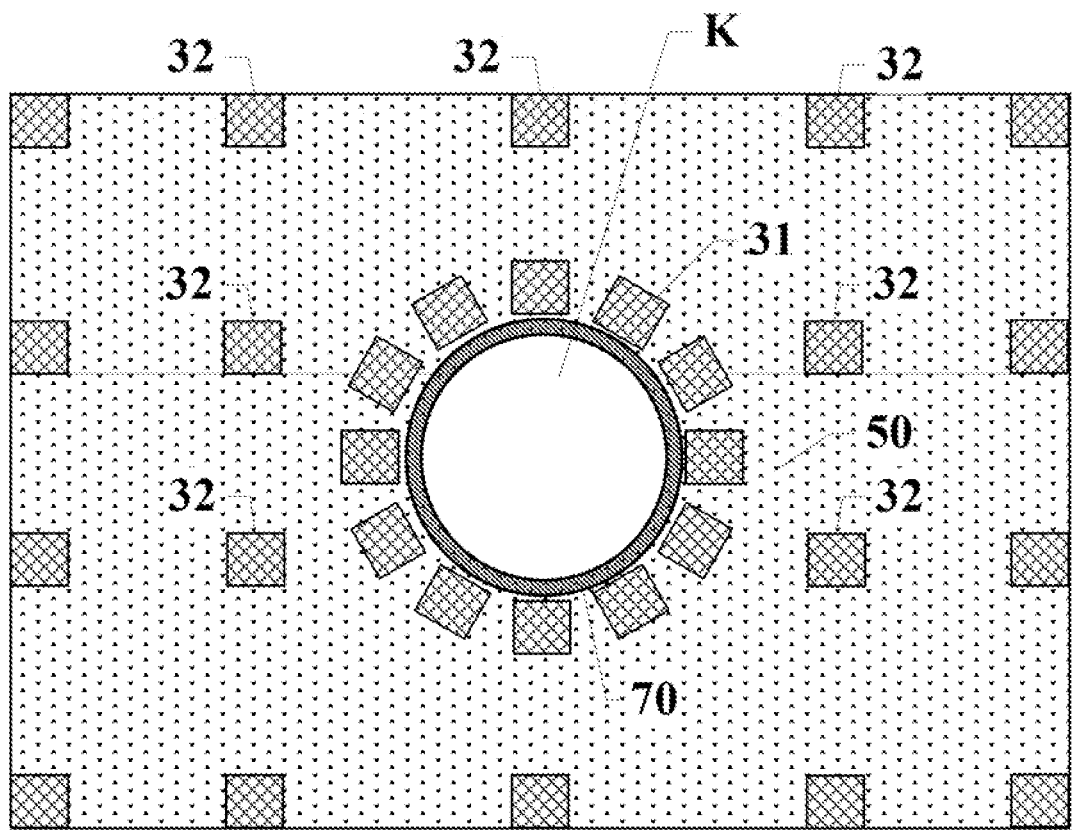
FIG. 16 illustrates a top view of a first sealant, first light-emitting elements and second light-emitting elements, consistent with various disclosed embodiments of the present disclosure.

In another embodiment as shown in FIG. 15 illustrating another cross-sectional view of the display module along the AA direction in FIG. 1 and FIG. 16 illustrating a top view of the first sealant 70, the first light-emitting elements 31 and the second light-emitting elements 32, the light-emitting elements 30 may be blue light-emitting elements and the backlight module 20 may further include a quantum dot film 22 arranged on the side of the light-emitting elements 30 away from the back plate 00. Along the direction perpendicular to the back plate 00, an orthographic projection of the quantum dot film 22 on the back plate 00 may cover the orthographic projection of the light-emitting elements 30 on the back plate 00.

The display module may also include a first sealant 70. Along the direction perpendicular to the back plate 00, the first sealant 70 may be located between the quantum dot film 22 and the back plate 00. Along the direction parallel to the back plate 00, the first sealant 70 may surround the through hole K, and may be located between the first light-emitting elements 31 and the through hole K. The first sealant 70 may be a non-transparent sealant.

In the present embodiment, the first light-emitting elements 31 and the second light-emitting elements 32 may be blue light-emitting elements. The quantum dot film 22 may be disposed on the side of the first light-emitting elements 31 and the second light-emitting elements 32 facing the display panel 10. Through the color conversion function of the quantum dot film 22, the blue light emitted by the light-emitting elements 30 may be converted into white light and provided to the display panel 10. In the present embodiment, the non-transparent first sealant 70 may be disposed between the first light-emitting elements 31 and the through hole K. The first sealant 70 may be arranged around the through hole K, and may block the blue light emitted by the first light-emitting elements 31 from entering the through-hole K through the side of the first light-emitting elements 31. That is, the non-transparent first sealant 70 may play a role in blocking the transmission of the blue light to the through-hole K, such that the light emitted from the first light-emitting elements 31 into the through-hole K is the light after color conversion through the quantum dot film 22. The phenomenon of bluishness in the display area corresponding to the through hole K may be avoided, thereby improving the overall display effect of the display panel 10.

Optionally, the non-transparent first sealant 70 may be a sealant with poor transmittance but not affecting the display effect. In one optional embodiment, the first sealant 70 may be a white sealant. When the white sealant is used, the white sealant may block the transmission of the blue light emitted by the first light-emitting elements 31 and may not produce a display boundary in the area corresponding to the through hole K, thereby improving the overall display effect of the display module.

In another embodiment shown in FIG. 15, the light-emitting elements 30 may be blue light-emitting elements and the backlight module 20 may further include a quantum dot film 22 arranged on the side of the light-emitting elements 30 away from the back plate 00. Along the direction perpendicular to the back plate 00, an orthographic projection of the quantum dot film 22 on the back plate 00 may cover the orthographic projection of the light-emitting elements 30 on the back plate 00.

The orthographic projection of the quantum dot film 22 on the back plate 00 may include a first edge B1 adjacent to the through hole K, and the back plate 00 may include a second edge B2 adjacent to the through hole K. The first edge B1 may be located on a side of the second edge B2 close to the through hole K. A distance D between the first edge B1 and the second edge B2 may be 0.2 mm≤D≤0.6 mm.

In the present embodiment, the quantum dot film 22 may be introduced into the display module and may be extended toward inside of the through hole K. The edge of the quantum dot film 22 adjacent to the through hole K may be the first edge B1, and the edge of the back plate 00 adjacent to the through hole K may be the second edge B2. The distance between the first edge B1 and the central axis of the through hole K may be smaller than the distance between the second edge B2 and the central axis of the through hole K. That is, the quantum dot film 22 may be further extended toward the central axis of the through hole K on the basis of covering the light-emitting elements 30. When the distance D between the first edge B1 and the second edge B2 is too small, for example, when D is less than 0.2 mm, at least part of the side light (blue light) of the first light-emitting elements 31 toward the through hole K may be emitted from the gap between the quantum dot film 22 and the first light-emitting elements 31, resulting in blue light appearing in the through-hole K. When the distance between the first edge B1 and the second edge B2 is too large, the quantum dot film 22 may occupy the space of the through hole K, and even affect the photosensitive effect of the photosensitive element in the through hole K. Therefore, in the present embodiment, the distance between the first edge B1 and the second edge B2 may be set to 0.2 mm≤D≤0.6 mm, such that a certain distance between the first light-emitting elements 31 and the first edge B1 of the quantum dot film 22 is maintained to avoid or reduce the amount of blue light emitted from the gap between the quantum dot film 22 and the first light-emitting elements 31 to the through hole K, and also prevent the quantum dot film 22 from affecting the photosensitive effect of the photosensitive element in the through hole K. The photosensitive accuracy of the photosensitive element may be improved. Optionally, in one embodiment, 0.3 mm≤D≤0.5 mm.

In one embodiment shown in FIG. 1 and FIG. 2, the display panel may be a liquid crystal display panel. The display panel 10 may include a first display area A1 and a second display area A2 surrounding the first display area A1. Along a direction perpendicular to the back plate 00, the first display area A1 may overlap with the through holes K, and the refractive index of the liquid crystal in the first display area A1 may be larger than the refractive index of the liquid crystal in the second display area A2.

The first display area A1 may be the display area directly above the through hole K, and the second display area A2 may be the conventional display area mentioned in the foregoing embodiments. Optionally, to prevent the display area directly above the through hole K from turning blue, other designs may be performed on the structure of the display panel 10 in the first display area to realize yellowing treatment of the first display area. For example, the liquid crystal with high refractive index may be disposed in the first display area such that the refractive index of the liquid crystal in the first display area is larger than the refractive index of the liquid crystal in the second display area. Therefore, the first display area may be yellowish. The yellowish first display area may absorb part of the blue light when the blue light is incident on the first display area, to improve the problem of the first display area being bluish.

Figure 17:
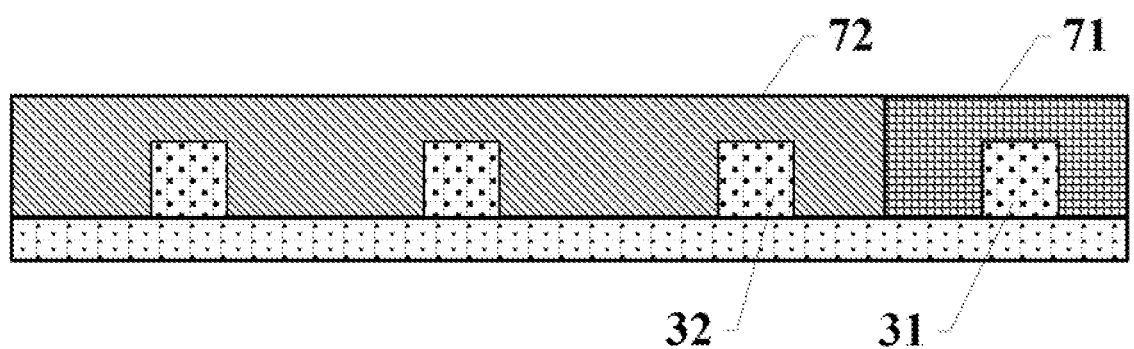
FIG. 17 illustrates an exemplary packaging diagram of first light-emitting elements and second light-emitting elements consistent with various disclosed embodiments of the present disclosure.

FIG. 17 is a schematic diagram of a package of the first light-emitting elements 31 and the second light-emitting elements 32. When the first light-emitting elements 31 and the second light-emitting elements 32 are blue light-emitting elements, the first light-emitting elements 31 may be packaged with a yellow-fluorescent glue 71, and the second light-emitting elements 32 may be packaged with a transparent sealing glue 72. Packaging the first light-emitting elements 31 and the second light-emitting element s32 with glue may improve the light-emitting reliability of the first light-emitting elements 31 and the second light-emitting elements 32. When the first light-emitting elements 31 are packaged with the yellow-fluorescent glue 71, the light emitted by the first light-emitting elements 31 may become white light after passing through the yellow fluorescent glue 71, such that the blue light emitted by the first light-emitting elements 31 may be prevented from irradiating into the through hole K. Also, the problem of the first display area corresponding to the through hole K being bluish may be alleviated.

In one embodiment shown in FIG. 10, the display module may further include a first polarizer P1. The first polarizer P1 may be located between the display panel 10 and the backlight module 20. A vertical distance H between the surface of the light-emitting elements 30 facing the display panel 10 and the surface of the first polarizer P1 facing the backlight module 20 may be H≥2 mm.

In the present disclosure, the distance between the first polarizer P1 of the display module and the top surface of the light-emitting elements 30 facing the display panel 10 may be specified to be H≥2 mm. When the distance between the first polarizer P1 of the display module and the top surface of the light-emitting elements 30 facing the display panel 10 increases, the light mixing distance of the light emitted by the light-emitting elements 30 before it is incident on the first polarizer P1 may be increased equivalently, and the light may be mixed sufficiently on the side of the first polarizer P1 facing the backlight module 20, such that the light provided to the display panel 10 through the backlight module 20 is more uniform. Therefore, the overall display uniformity of the display panel 10 may be improved. In the actual production process, the distance between the first polarizer P1 and the light-emitting elements 30 may be increased by appropriately increasing the thickness of the adhesive between the backlight module 20 and the first polarizer P1.

In one embodiment, H may be H≤3 mm. When the distance between the first polarizer P1 and the light-emitting elements 30 is larger, the light mixing effect may be better. When considering the overall thickness of the display module, the distance between the first polarizer P1 and the light-emitting elements 30 may be limited to be smaller than or equal to 3 mm. The overall display uniformity of the product may be improved while realizing the thinning requirements of the product.

Figure 18:
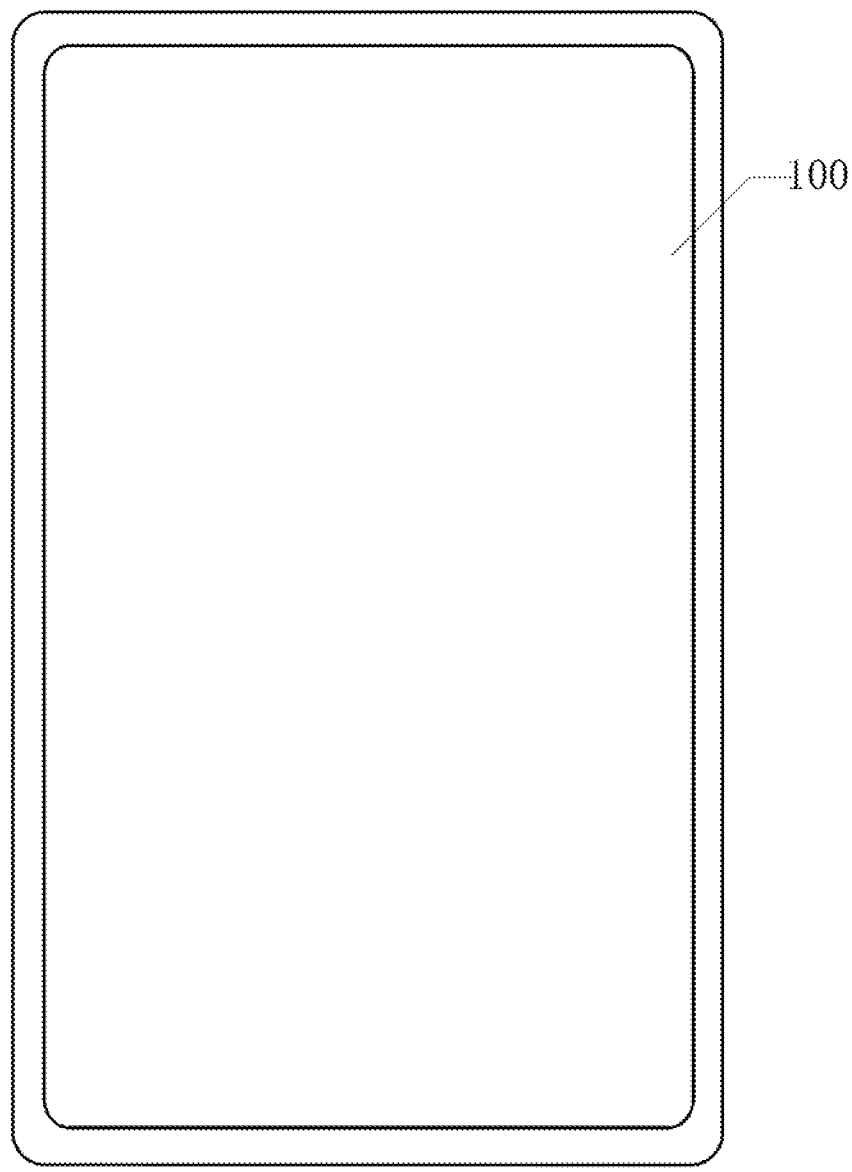
FIG. 18 illustrates an exemplary display device consistent with various disclosed embodiments of the present disclosure.

The present disclosure also provides a display device. As shown in FIG. 18 which is a schematic diagram of a display device 200 provided by one embodiment of the present disclosure, the display device 200 may include a display module 100 provided by any embodiments of the present disclosure. In the present disclosure, by increasing the arrangement density of the first light-emitting elements around the through hole, the display brightness of the display area corresponding to the through hole in the display device may be increased, reducing the brightness difference between the display area corresponding to the through hole and other display areas in the display stage. The display brightness uniformity of the normal display area of the display device and the display area corresponding to the through hole may be improved, improving the display effect of the display device in the display stage. At the same time, since the area corresponding to the through hole may be able to play a display role in the display stage, the screen ratio of the display device may be also increased, to realize the narrow frame design of the display module.

The display device 200 may be any product or component with realistic functions such as a mobile phone, a tablet computer, a television, a monitor, a notebook computer, a digital photo frame, a navigator, and the like.

In the display module and the display device provided by the present disclosure, the display panel may be arranged in the light-emitting direction of the backlight module. The backlight module may be provided with the through hole. The backlight module may include the first region arranged around the through hole and the second region arranged around the first region. The first light-emitting elements may be disposed in the first region and the second light-emitting elements may be disposed in the second region. The first light-emitting elements may be arranged around the through hole, and the arrangement density of the first light-emitting elements may be larger than the arrangement density of the second light-emitting elements. The overall light output of the first light-emitting elements in the first region may be increased. Since the first light-emitting elements are arranged around the through holes, the light emitted by the first light-emitting elements may be emitted to the display area corresponding to the through hole, and the brightness of the display area corresponding to the through hole may be compensated. The arrangement density of the first light-emitting elements may be relatively high. Therefore, the brightness compensation effect of the display area corresponding to the through hole may be improved. Therefore, the display brightness difference between the conventional display area and the display area corresponding to the through hole may be reduced, improving the overall display uniformity and the overall display effect of the display panel.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above-described embodiments, the present disclosure is not limited to the above-described embodiments, but may be embodied in other equivalent forms without departing from the scope of the present disclosure, which is determined by the appended claims.

What is claimed is:

1. A display module, comprising a backlight module and a display panel, wherein:
   the display panel is located at a light-emitting direction of the backlight module;
   the backlight module includes a through hole penetrating through the backlight module along a thickness direction of the backlight module;
   the backlight module has a first region and a second region surrounding the first region;
   the first region surrounds the through hole;
   the backlight module includes a back plate and light-emitting elements arranged on a side of the back plate and directly facing a surface of the display panel;
   the light-emitting elements include first light-emitting elements located in the first region and second light-emitting elements located in the second region;
   the first light-emitting elements are arranged around the through hole; and
   an arrangement density of the first light-emitting elements facing the surface of the display panel is larger than an arrangement density of the second light-emitting elements facing the surface of the display panel.

2. The display module according to claim 1, wherein:
   the first light-emitting elements and the second light-emitting elements have different light-emitting patterns.

3. The display module according to claim 1, wherein:
   one first light-emitting element of the first light-emitting elements includes a light-emitting body and a reflective layer;
   the light-emitting body includes a first body and a second body arranged along a radial direction of the through hole;
   the first body is located between the second body and the through hole; and
   the reflective layer is located at least on a surface of the second body away from the back plate.

4. The display module according to claim 3, wherein:
   the reflective layer is also located on at least part of sidewalls of the second body.

5. The display module according to claim 3, wherein:
   the first body includes a first surface, a second surface, and a third surface located between the first surface and the second surface along a first direction, wherein the third surface is respectively connected to the first surface and the second surface;
   the second surface is located on a side of the first surface facing the back plate, and the first direction is perpendicular to the back plate; and
   an angle between the first surface and the third surface is an obtuse angle.

6. The display module according to claim 1, further comprising a photosensitive element in the through hole, wherein:
   the photosensitive element and the first light-emitting elements are activated at different times.

7. The display module according to claim 1, further comprising a first optical film in the through hole, wherein:
   the first optical film is located between the display panel and the first light-emitting elements;
   the first optical film includes a first hollow that penetrates through the first optical film along a thickness direction of the first optical film;
   orthographic projections of the first light-emitting elements to a plane where the back plate is located surround an orthographic projection of the first hollow on the plane where the back plate is located;
   a side of the first optical film facing the first light-emitting elements is provided with a first microstructure; and
   at least part of light emitted by the first light-emitting elements enters the first hollow through the first microstructure, and is transmitted to the display panel.

8. The display module according to claim 7, further comprising a second optical film in the through hole, wherein:
   the second optical film is located on a side of the first optical film away from the first light-emitting elements;
   the second optical film is a planar structure, and includes a first surface and a second surface opposite to each other;
   the second surface is located between the first surface and the first optical film;
   the first surface is parallel to the back plate;
   the second surface is provided with a second microstructure; and
   light emitted from the first optical film passes through the second microstructure and exits along a direction perpendicular to the first surface.

9. The display module according to claim 7, wherein:
   the backlight module further includes an optical module on a side of the light-emitting elements away from the back plate;
   along a direction parallel to the back plate, the optical module surrounds the first optical film; and
   along the direction perpendicular to the back plate, the optical module covers the second light-emitting elements, and does not overlap the first light-emitting elements.

10. The display module according to claim 1, wherein:
    the backlight module further includes an optical module on a side of the light-emitting elements away from the back plate; and along the direction perpendicular to the back plate, the optical module covers the second light-emitting elements and the first light-emitting elements.

11. The display module according to claim 1, wherein:
the light-emitting elements are blue light-emitting elements;
the backlight module also includes a quantum dot film arranged on a side of the light-emitting elements away from the back plate;
along the direction perpendicular to the back plate, an orthographic projection of the quantum dot film on the back plate covers an orthographic projection of each of the light-emitting elements on the back plate;
the display module further includes a first sealant;
along the direction perpendicular to the backplate, the first sealant is located between the quantum dot the film and the back plate;
along the direction parallel to the back plate, the first sealant surrounds the through hole, and is located between the first light-emitting elements and the through hole; and
the first sealant is a non-transparent sealant.

12. The display module according to claim 11, wherein:
the first sealant is a white sealant.

13. The display module according to claim 1, wherein:
the light-emitting elements are blue light-emitting elements;
the backlight module also includes a quantum dot film arranged on a side of the light-emitting elements away from the back plate;
along the direction perpendicular to the back plate, an orthographic projection of the quantum dot film on the back plate covers an orthographic projection of each of the light-emitting elements on the back plate;
an orthographic projection of the quantum dot film on the back plate includes a first edge adjacent to the through hole, and the back plate includes a second edge adjacent to the through hole;
the first edge is located at a side of the second edge close to the through hole; and
a distance between the first edge and the second edge is D, wherein 0.2 mm≤D≤0.6 mm.

14. The display module according to claim 1, further comprising a first polarizer between the display panel and the backlight module, wherein:
a vertical distance between a surface of the light-emitting elements facing the display panel and surfaces of the first polarizer facing the backlight module is H, wherein H≥2 mm.

15. The display module according to claim 14, wherein: H≤3 mm.

16. The display module according to claim 1, wherein:
the display panel includes a first display area and a second display area surrounding the first display area;
along the direction perpendicular to the back plate, the first display area overlaps the through hole; and
a refractive index of the liquid crystal in the first display area is larger than a refractive index of the liquid crystal in the second display area.

17. A display module comprising a backlight module and a display panel, wherein:
the display panel is located at a light-emitting direction of the backlight module;
the backlight module includes a through hole penetrating through the backlight module along a thickness direction of the backlight module;
the backlight module has first region and a second region surrounding the first region;
the first region surrounds the through hole;
the backlight module includes a back plate and light-emitting elements arranged on a side of the back plate facing the display panel;
the light-emitting elements include first light-emitting elements located in the first region and second light-emitting elements located in the second region;
the first light-emitting elements are arranged around the through hole;
an arrangement density of the first light-emitting elements is larger than an arrangement density of the second light-emitting elements;
the first light-emitting elements include a plurality of first sub-light-emitting elements and a plurality of second sub-light-emitting elements arranged alternately around the through hole;
the plurality of first sub-light-emitting elements is connected in series, and the plurality of second sub-light-emitting elements is connected in series; and
the plurality of first sub-light-emitting elements and the plurality of second sub-light-emitting elements are respectively connected to different signal terminals.

18. The display module according to claim 17, wherein:
the second light-emitting elements includes third sub-light-emitting elements and fourth sub-light-emitting elements;
the third sub-light-emitting elements surround the first light-emitting elements, and the fourth sub-light-emitting elements surround the third sub-light-emitting elements; and
in response to the photosensitive element in an off state, one of the plurality of first sub-light-emitting elements and the plurality of second sub-light-emitting elements is in an on-state, and a driving current of the third sub-light-emitting elements is larger than a driving current of the fourth sub-light-emitting elements; or in response to the photosensitive element in the off state, the plurality of first sub-light-emitting elements and the plurality of second sub-light-emitting elements are in the on-state, and the driving current of the third sub-light-emitting elements is smaller than the driving current of the fourth sub-light-emitting elements.

19. A display device comprising a display module including a backlight module and a display panel, wherein:
the display panel is located at a light-emitting direction of the backlight module;
the backlight module includes a through hole penetrating through the backlight module along a thickness direction of the backlight module;
the backlight module has a first region and a second region surrounding the first region;
the first region surrounds the through hole;
the backlight module includes a back plate and light-emitting elements arranged on a side of the back plate and directly facing a surface of the display panel;
the light-emitting elements include first light-emitting elements located in the first region and second light-emitting elements located in the second region;
the first light-emitting elements are arranged around the through hole; and
an arrangement density of the first light-emitting elements facing the surface of the display panel is larger than an arrangement density of the second light-emitting elements facing the surface of the display panel.

\* \* \* \* \*